(12) United States Patent
Inatomi et al.

(10) Patent No.: US 7,282,298 B2
(45) Date of Patent: Oct. 16, 2007

(54) ELECTROCHEMICAL DEVICE

(75) Inventors: Yuu Inatomi, Moriguchi (JP); Mikinari Shimada, Yawata (JP); Nobuhiko Hojo, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 596 days.

(21) Appl. No.: 10/648,271

(22) Filed: Aug. 27, 2003

(65) Prior Publication Data

US 2004/0045818 A1  Mar. 11, 2004

(30) Foreign Application Priority Data

Aug. 29, 2002 (JP) .............................. 2002-250416

(51) Int. Cl.
*H01M 4/60* (2006.01)

(52) U.S. Cl. .............. 429/213; 429/231.95; 429/231.5; 429/218.1; 429/233

(58) Field of Classification Search ................. 429/213, 429/231.8, 233, 218.1, 231.5, 231.95; 204/291
See application file for complete search history.

(56) References Cited

U.S. PATENT DOCUMENTS

| | | | |
|---|---|---|---|
| 2,715,778 A | 8/1955 | Murdock | |
| 4,833,048 A | 5/1989 | Dejonghe et al. | |
| 5,523,179 A | 6/1996 | Chu | |
| 5,833,048 A | 11/1998 | Dilly | |

FOREIGN PATENT DOCUMENTS

| | | |
|---|---|---|
| EP | 190 706 A2 | 8/1986 |
| EP | 0 602 984 A2 | 6/1994 |
| EP | 0 638 947 A1 | 2/1995 |
| EP | 0 650 208 A1 | 4/1995 |
| JP | 60-014762 | 1/1985 |
| JP | 01-172382 | 7/1989 |
| JP | 05-074459 | 3/1993 |
| JP | 8-195199 | * 7/1996 |
| JP | 10-106624 | * 4/1998 |
| WO | WO 85/01293 | 3/1985 |
| WO | WO 90/13150 | 11/1990 |
| WO | WO 96/03778 | 2/1996 |
| WO | WO 96/41388 | 12/1996 |
| WO | WO 02/25751 A2 | 3/2002 |

OTHER PUBLICATIONS

Liu, Mellin., et al. "Novel Solid Redox Polymerization Electrodes," Journal of Electrochemical Society, vol. 138, No. 7, Jul. 1991, pp. 1896-1901.

* cited by examiner

*Primary Examiner*—Laura Weiner
(74) *Attorney, Agent, or Firm*—McDermott Will & Emery LLP

(57) ABSTRACT

An electrochemical device for providing an electric energy by converting an electron transfer involved in an oxidation-reduction reaction into an electric energy comprising a positive electrode, a negative electrode and an electrolyte, wherein at least one of the positive and negative electrodes comprises a compound having a structure represented by the general formula (1):

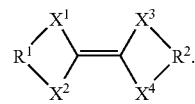

12 Claims, 1 Drawing Sheet

F I G. 1
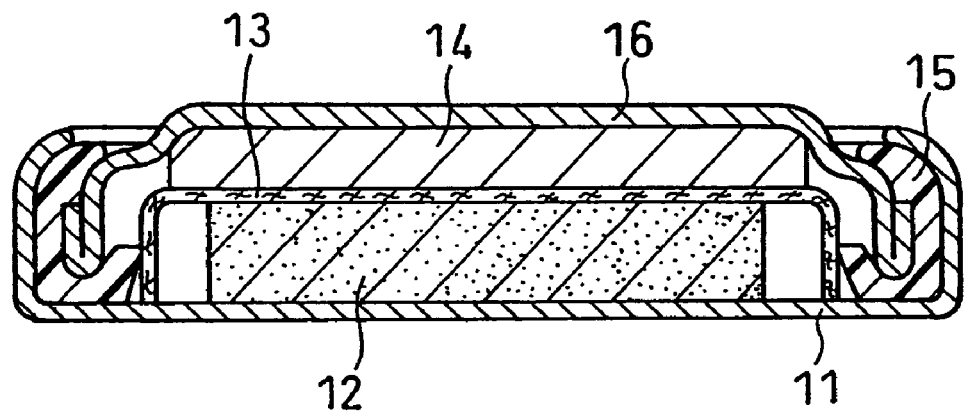

ELECTROCHEMICAL DEVICE

BACKGROUND OF THE INVENTION

With the recent development of mobile communication devices and portable electronic devices, demand is greatly increasing for power sources for those devices such as batteries and capacitors. In particular, rechargeable lithium secondary batteries are widely used as a power source for portable electronic devices because they have high electromotive force and high energy density and are capable of operating repeatedly.

As the miniaturization and weight reduction of portable electronic devices advance, however, the demand is increasingly focused on a battery with high energy density. Accordingly, a novel electrode material with high energy density is desired. Under such circumstances, material development has actively been carried out with the objective of creating an electrode material with high energy density and high power density that can directly contribute to the production of a high energy and high power density battery.

In order to produce a more lightweight battery with high energy and high power density, the use of an organic compound as an electrode material has been investigated. Organic compounds are as light as a specific gravity of about 1 g/cm$^3$, which is lighter than oxides currently used as a material for lithium secondary batteries such as lithium cobaltate. With the use of an organic material, it is possible to produce a lightweight battery with high capacity.

U.S. Pat. No. 5,833,048 and Japanese Patent No. 2,715,778 propose a secondary battery using an organic compound with disulfide bonds as an electrode material. This organic sulfur compound is most simply represented by the formula: $M^+-^-S-R-S^-M^+$, where R represents an aliphatic or an aromatic organic group, S represents sulfur, and $M^+$ represents a proton or metal cation. The compound bonds together by an S—S bond through an electrochemical oxidation reaction to give a polymer with a structure of $M^+-^-S-R-S-S-R-S-S-R-S^--M^+$. Thus-produced polymer returns to the original monomers by an electrochemical reduction reaction. This reaction is applicable to a charge/discharge reaction in secondary batteries.

U.S. Pat. No. 5,523,179 proposes to use elementary substance sulfur as an electrode material.

In either case, however, the problem arises that the materials have low cycle life characteristics although it is possible to achieve high capacity. This is because a recombination frequency is low in the dissociation and recombination of a disulfide bond during the oxidation-reduction reaction of a sulfur-based material. Low recombination frequency means that all reactive portions can not react even if the material theoretically has high energy density. Therefore, it cannot actually be said that the compounds of the above related art examples are materials having high energy density.

BRIEF SUMMARY OF THE INVENTION

As described above, a lightweight electrochemical device with high energy density which uses a sulfur-based material as an electrode material has the problem that it has low cycle characteristics because the structural change of a sulfur-based material occurs with an oxidation-reduction reaction. In view of this, the present invention is intended to improve the cycle characteristics of a lightweight electrochemical device with high energy density.

The present invention relates to an electrochemical device for providing an electric energy by converting an electron transfer involved in an oxidation-reduction reaction into an electric energy comprising a positive electrode, a negative electrode and an electrolyte, wherein at least one of the positive and negative electrodes comprises a compound having a structure represented by the general formula (1):

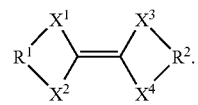

where $R^1$ and $R^2$ are independent of each other and each represents a linear or cyclic aliphatic group; $X^1$, $X^2$, $X^3$ and $X^4$ are independent of each other and each represents a sulfur atom, an oxygen atom, a selenium atom or a tellurium atom; the aliphatic group can comprise at least one selected from the group consisting of an oxygen atom, a nitrogen atom, a sulfur atom, a silicon atom, a phosphorus atom and a boron atom.

In the general formula (1), the aliphatic group is not specifically limited, but an aliphatic group with 1 to 6 carbon atoms is preferred. Particularly, it is preferable to select an aliphatic group such that the structure of the general formula (1) is a structure in which two cyclic groups having delocalized π electrons are connected by a double-bond.

As a compound having a structure represented by the general formula (1), the following compounds can be used.

A compound represented by the general formula (2):

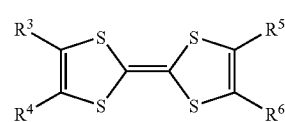

where $R^3$, $R^4$, $R^5$ and $R^6$ are independent of each other and each represents a linear or cyclic aliphatic group, a hydrogen atom, a hydroxyl group, a cyano group, an amino group, a nitro group or a nitroso group; and the aliphatic group can comprise at least one selected from the group consisting of an oxygen atom, a nitrogen atom, a sulfur atom, a silicon atom, a phosphorus atom, a boron atom and a halogen atom.

A compound represented by the general formula (3):

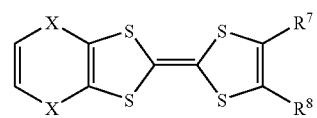

where $R^7$ and $R^8$ are independent of each other and each represents a linear or cyclic aliphatic group, a hydrogen atom, a hydroxyl group, a cyano group, an amino group, a nitro group or a nitroso group; X represents a sulfur atom, an oxygen atom, a selenium atom or a tellurium atom; and the aliphatic group can comprise at least one selected from the group consisting of an oxygen atom, a nitrogen atom, a sulfur atom, a silicon atom, a phosphorus atom, a boron atom and a halogen atom.

A compound represented by the general formula (4):

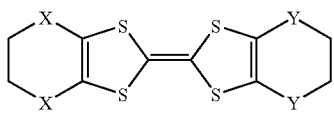

where X and Y are independent of each other and each represents a sulfur atom, an oxygen atom, a selenium atom, a tellurium atom or a methylene group.

A compound represented by the general formula (5):

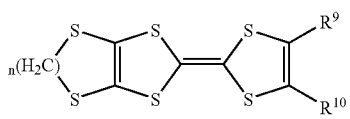

where $R^9$ and $R^{10}$ are independent of each other and each represents a linear or cyclic aliphatic group, a hydrogen atom, a hydroxyl group, a cyano group, an amino group, a nitro group or a nitroso group; the aliphatic group can comprise at least one selected from the group consisting of an oxygen atom, a nitrogen atom, a sulfur atom, a silicon atom, a phosphorus atom, a boron atom and a halogen atom; and n is not less than 1.

The compound represented by the chemical formula (6):

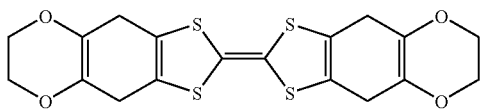

Examples of the aliphatic group in the general formulae (2), (3) and (5) include an alkyl group, a cycloalkyl group, an alkoxy group, a hydroxyalkyl group, a thioalkyl group, an aldehyde group, a carboxylic acid group, an alkyl halide group, etc.

As a compound having a structure represented by the general formula (1), it is also possible to use a polymer compound having a plurality of the structure represented by the general formula (1).

The polymer compound preferably has a polyacetylene chain as a main chain.

The polymer compound preferably forms a film. The film preferably has a thickness of 10 to 300 μm. Such film can be obtained by chemical synthesis or by electrolytic polymerization of a monomer compound having a structure of the formula (1).

In an electrochemical device of the present invention, the electrolyte preferably comprises a solvent and an anion and a cation dissolved in the solvent, and the compound is preferably capable of forming a coordinate bond with the cation and/or anion through an oxidation-reduction reaction.

The cation is preferably a lithium ion.

In one embodiment of an electrochemical device of the present invention, it is preferred that the positive electrode includes a compound having a structure represented by the general formula (1) as a positive electrode active material and the negative electrode includes a carbonaceous material as a negative electrode active material.

In another embodiment of an electrochemical device of the present invention, it is preferred that the positive electrode includes the aforesaid compound as the positive electrode active material and the negative electrode includes, as a negative electrode active material, at least one selected from the group consisting of a lithium metal, a lithium-containing composite nitride and a lithium-containing composite titanium oxide.

The present invention further relates to an electrode active material for an electrochemical device containing at least one of compounds having a structure represented by any of the aforementioned formulae (1) to (6).

The present invention relates to an electrochemical device for providing an electric energy by converting an electron transfer involved in an oxidation-reduction reaction into an electric energy comprising a positive electrode, a negative electrode and an electrolyte, wherein at least one of the positive and negative electrodes comprises a compound having a structure represented by the general formula (1) and a substrate carrying the compound, and the substrate and the compound having the structure represented by the general formula (1) are bonded by a chemical bond.

The chemical bond is preferably at least one selected from the group consisting of a covalent bond and a coordinate bond.

The covalent bond is preferably at least one selected from the group consisting of an Si—O bond, a Ti—O bond and an amido bond.

The coordinate bond is preferably a metal-sulfur bond.

As the substrate, a metal, a metal oxide, a layered clay compound, a carbonaceous compound, a silicon compound or a resin can be used.

The present invention further relates to an electrode active material for an electrochemical device comprising the compound and the substrate carrying the compound, wherein the substrate and the compound are bonded by a chemical bond.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a vertical sectional view of a coin type battery produced in EXAMPLEs of the present invention.

DETAILED DESCRIPTION OF THE INVENTION

An electrochemical device of the present invention provides an electric energy by converting an electron transfer involved in an oxidation-reduction reaction into an electric energy and comprises a positive electrode, a negative electrode and an electrolyte. At least one of the positive and negative electrodes comprises a compound having a structure represented by the general formula (1):

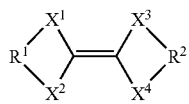

where $R^1$ and $R^2$ are independent of each other and each represents a linear or cyclic aliphatic group; $X^1$, $X^2$, $X^3$ and $X^4$ are independent of each other and each represents a sulfur atom, an oxygen atom, a selenium atom or a tellurium atom; and the aliphatic group can comprise at least one selected from the group consisting of an oxygen atom, a nitrogen atom, a sulfur atom, a silicon atom, a phosphorus atom and a boron atom. Hereinafter, the compound may be referred to as "active material compound". The active material compound causes an oxidation-reduction reaction in a battery and therefore gives and receives electrons.

The active material compound can cause an oxidation-reduction reaction without any significant structural change therein. The mechanism is as follows.

The active material compound is symmetrical in structure and has a planar structure. The active material compound also has cyclic structures containing a chalcogen element such as sulfur and oxygen and has a carbon-carbon double bond between the cyclic structures. The chalcogen elements have lone electron pairs.

Accordingly, a conjugated π-electron cloud is formed over the molecules. The conjugated π-electron cloud extended over the molecules can give and receive electrons. This giving and receiving of electrons proceeds as the oxidation-reduction reaction of the active material compound.

During reduction reaction (discharge reaction), for example, the active material compound is reduced and cations in the electrolyte coordinate to reduced molecules. During subsequent oxidation reaction (charge reaction), the cations coordinated to the active material compound leave the compound. This reaction can be used as a battery reaction.

During oxidation reaction (charge reaction), on the other hand, the active material compound is oxidized and anions in the electrolyte coordinate to oxidized molecules. During subsequent reduction reaction (discharge reaction), the anions coordinated to the active material compound leave the compound.

In such oxidation-reduction reaction, it is considered that the active material compound causes no significant structural change such as dissociation and recombination of bond. If the molecular structure of the compound significantly changes concomitantly with the oxidation-reduction reaction, another molecular structure change will be required during subsequent reaction, which requires considerable energy. The reactivity, therefore, is reduced. No significant structural change concomitantly with the oxidation-reduction reaction suggests an efficient progress of the reaction.

As described above, the present invention employs, as an electrode active material, a compound in which a conjugated π-electron portion extended over molecules is used as oxidation-reduction reaction site. In the aforesaid mechanism, no significant change occurs in the skeleton of the active material concomitantly with the oxidation-reduction reaction. This suppresses a degradation in the structure of the active material due to the repetition of the oxidation-reduction reaction; therefore, excellent charge/discharge cycle characteristics are obtained.

Furthermore, the aforesaid reaction mechanism is expected to proceed more rapidly than the dissociation-recombination reaction caused by a conventional organic sulfur-based compound. As the reaction proceeds more rapidly, excellent rate property can be expected in terms of battery characteristics. Accordingly, it is also advantageous for rapid charge/discharge.

In the present invention, particularly, a compound having a tetrathiafulvalene structure is preferably used among compounds having a structure represented by the general formula (1). Any compound including monomer compounds and polymer compounds can be used if it has a structure represented by the general formula (1). They may be used singly or in combination of two or more.

In the present invention, the term "polymer compound" means a compound with a molecular weight of not less than 10000 prepared by polymerization of monomer compounds. The polymer compound has a lower solubility in an electrolyte or the like than monomer compounds. Accordingly, when the polymer compound is used as an electrode active material, the elution of the active material to an electrolyte is suppressed, making cycle characteristics more stable.

Preferred polymer compound is a compound having a polyacetylene chain as a main chain. Moreover, it is preferred that one molecular contains not less than two structures represented by the general formula (1). The molecular weight of the polyacetylene chain is preferably 10000 to 200000.

Preferred examples of the active material compound include the compound represented by the following chemical formulae (6) to (17):

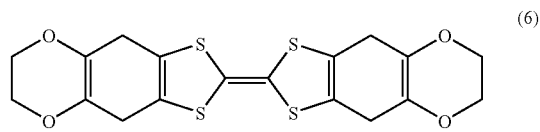

(6)

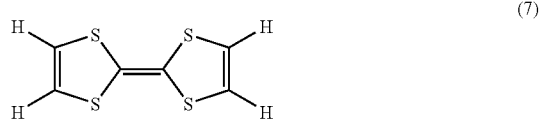

(7)

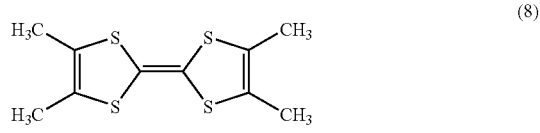

(8)

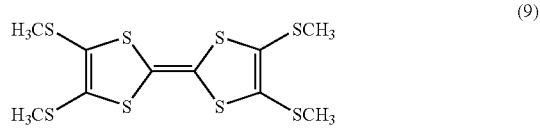

(9)

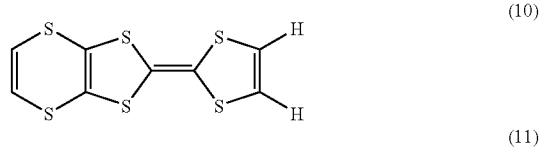

(10)

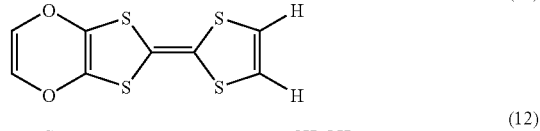

(11)

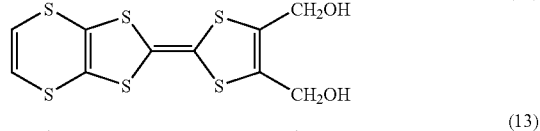

(12)

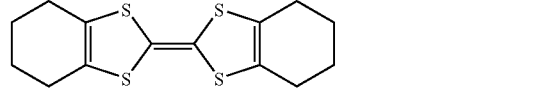

(13)

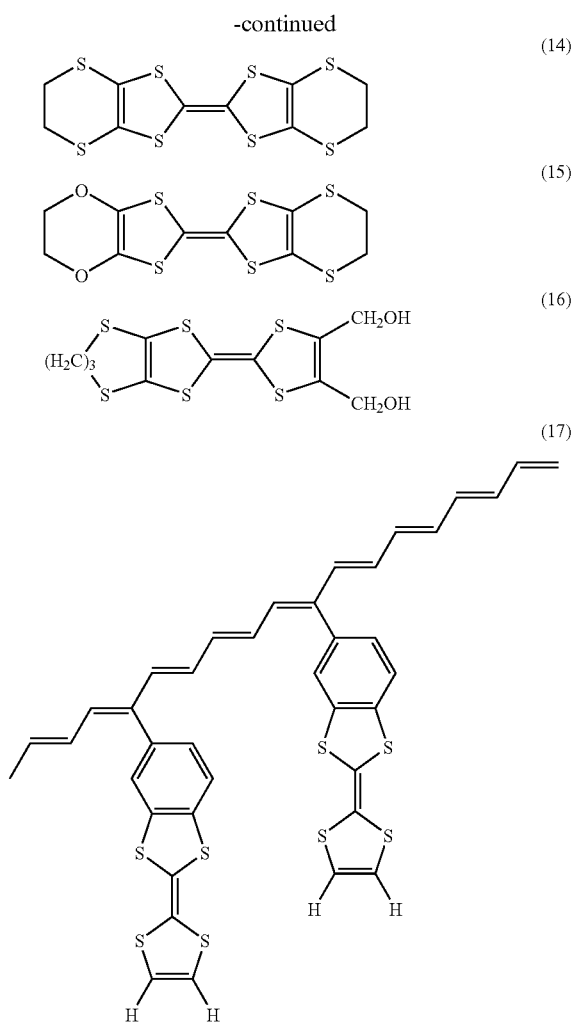

They may be used singly or in combination of two or more.

The active material compound is suitable, among electrochemical devices, for use in secondary batteries, but it can also be used for other electrochemical devices such as primary batteries, electrolytic capacitors, various sensors and electrochromic devices.

In the case of using a compound having a structure represented by the general formula (1) in a secondary battery, it may be used for both positive and negative electrodes, or for either positive or negative electrode. When the compound is used for one of the electrodes, any conventional active material for secondary batteries can be used for the other electrode without limitation.

In the case of using a compound having a structure represented by the general formula (1) as the positive electrode active material, the negative electrode active material may comprise, for example, a carbonaceous material such as graphite or amorphous carbon, a lithium metal, a lithium-containing composite nitride, a lithium-containing titanium oxide, a composite of Sn and carbon, a composite of Sn and other metal or the like.

In the case of using a compound having a structure represented by the general formula (1) as the negative electrode active material, the positive electrode active material may comprise, for example, a metal oxide such as $LiCoO_2$, $LiNiO_2$ or $LiMn_2O_4$.

In the case of using a compound having a structure represented by the general formula (1) as an electrode active material, in order to reduce electrode resistance, a carbonaceous material such as carbon black (acetylene black, for example) or graphite; or a conductive polymer such as polyanilin, polypyrrole or polythiophene may be added to the electrode active material as a conductive material. Moreover, a solid electrolyte comprising polyethylene oxide or the like or a gel electrolyte comprising polymethyl methacrylate or the like may be added to the electrode active material as an ion conductive material.

In order to improve adhesive property between the constituent materials in an electrode, a binder may be used. Examples of the binder include polyvinylidene fluoride, vinylidenefluoride-hexafluoropropylene copolymer, vinylidenefluoride-tetrafluoroethylene copolymer, polytetrafluoroethylene, styrene-butadiene copolymer, polypropylene, polyethylene, polyimide, etc.

As the positive or negative electrode current collector, a metal foil or a metal mesh comprising nickel, aluminum, gold, silver, copper, stainless steel, an aluminum alloy or the like can be used. Carbon may be applied to the current collector in order to decrease the resistance value of an electrode, to give a catalytic effect to the current collector, or to chemically or physically bind the current collector and an active material.

In the case where a separator is interposed between the positive and negative electrodes, the separator should be impregnated with an electrolyte. The electrolyte preferably comprises a solvent and a solute dissolved in the solvent. The electrolyte itself may be made into a gel so that the electrolyte functions as separator. In such case, it is preferred that a liquid electrolyte is impregnated into a matrix such as polyacrylonitrile; a polymer containing an acrylate unit or a methacrylate unit; or a copolymer of ethylene and acrylonitrile. As the matrix, a crosslinked polymer is preferably used.

As the solute for the electrolyte, halides of alkali metals such as lithium, sodium and potassium; halides of alkaline earth metals such as magnesium; perchlorate; and salts of fluorine-containing compounds typified by trifluoromethanesulfonate are preferred. Specific examples thereof include lithium fluoride, lithium chloride, lithium perchlorate, lithium trifluoromethanesulfonate, lithium tetrafluoroborate, lithium bis(trifluoromethylsulfonyl)imide, lithium thiocyanate, magnesium perchlorate, magnesium trifluoromethanesulfonate, sodium tetrafluoroborate, etc. They may be used singly or in combination of two or more.

As the solvent for the electrolyte, organic solvents such as ethylene carbonate, propylene carbonate, dimethyl carbonate, diethyl carbonate, methyl ethyl carbonate, γ-butyrolactone, tetrahydrofuran, dioxolane, sulfolane and dimethylformamide are preferred.

A solid electrolyte may be used instead of the above liquid electrolyte. Examples of the solid electrolyte include $Li_2S$—$SiS_2$, $Li_2S$—$P_2O_5$, $Li_2S$—$B_2S_5$, $Li_2S$—$P_2S_5$—$GeS_2$, sodium/alumina ($Al_2O_3$), amorphous polyether or polyether with a low phase transition temperature (Tg), amorphous vinylidene fluoride-hexafluoropropylene copolymer, blends of different polymers, polyethylene oxide, etc.

The active material compound can be carried on a substrate by a chemical bond. In such case, the active material compound may be its derivative. The chemical bond may be a covalent or a coordinate bond. The active material carried on a substrate can improve the stability of the electrode (positive electrode in particular) active material and the cycle characteristics of the battery.

As the covalent bond, an Si—O bond, a Ti—O bond, an amido bond or a peptide bond is preferred. As the coordinate bond, a metal-sulfur bond is preferred.

The substrate can comprise a metal, a metal oxide, a layered clay compound, a carbonaceous material, a silicon compound or a resin. Preferred examples of the metal include aluminum, titanium, nickel, stainless steel, gold, silver, copper, platinum, palladium, etc; those of the metal oxide include glass, alumina, titania, etc; and those of the carbonaceous material include carbon black such as acetylene black, graphite, etc. They may be surface-treated in order to increase the amount of functional groups such as surface hydroxyl groups and surface carboxyl groups. As the resin, fluorocarbon resins, carbon-based resins, silicone resins, amide resins and conductive resins are preferred. As the conductive resin, polyaniline, polypyrrole and polythiophene are preferred.

The Si—O bond or Ti—O bond is formed, for example, by dehydrohalogenation or dealcoholization reaction of an organic silicon compound represented by $R_nSiX_{(4-n)}$ or an organic titanium compound represented by $R_nTiX_{(4-n)}$ (where each R independently represents an organic group, each X independently represents a halogen atom, an alkoxy group or an acyloxy group, and n is an integer of 1 to 3) with hydroxyl groups being present on the substrate.

In the case where the organic silicon compound is $RSiCl_3$, an Si—O bond is formed by the following reaction.

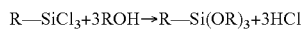

Accordingly, it is preferred that numerous hydroxyl groups are present on the surface of the substrate. The above-described dehydrohalogenation reaction is mostly used for hydrophobic treatment of glass surface. Using glass fiber with an adhesive property to a resin improved by this dehydrohalogenation reaction, for example, glass-fiber-reinforced resin is manufactured.

Here, the use of a compound such as an organic silicon compound represented by $R_nSiX_{(4-n)}$ or an organic titanium compound represented by $R_nTiX_{(4-n)}$ in which R has a structure represented by the general formula (1), enables the compound having a structure represented by the general formula (1) to be carried on the substrate.

In practice, $R_nSiX_{(4-n)}$ or $R_nTiX_{(4-n)}$ in which R has a structure represented by the general formula (1) is dissolved in a solvent, and a substrate is immersed in the obtained solution. Thereby, a condensation reaction proceeds to make the compound having a structure represented by the general formula (1) carried on the substrate.

Various chemical bonds can be formed by changing the functional group on the substrate surface and the substituent of a compound having a structure represented by the general formula (1). In the case of using amino groups on the substrate surface and carboxyl groups as the substituent of the compound having a structure represented by the general formula (1), for example, an amido bond is formed between an amino group and a carboxyl group. The amino group and the carboxyl group may exist in whichever of the substrate and the compound having a structure represented by the general formula (1).

As for a metal-sulfur bond, it can be formed by a reaction of a metal with a thiol group. It is well known that a thiol group coordinates or adsorbs to a metal to form a metal-sulfur bond. Using this reaction, a thiol group forms a self-assembly film on the surface of a metal. By bringing the active material compound having a thiol group as a substituent in contact with a metal, a coordination reaction proceeds to form a metal-sulfur bond. Examples of the substrate, other than metal, include resin with metal ions on the surface thereof, carbonaceous material, etc.

Examples of the chemical bond between the active material compound and the substrate, other than the above, include a carbon-carbon single bond, a carbon-carbon double bond, a carbon-chalcogen atom bond, a sulfur-sulfur bond, a metal-carbon bond, etc.

Also, in the case of using the active material compound carried on the substrate as an electrode active material, a binder may be used in order to improve adhesive property of the electrode constituent materials. The substrate and the active material compound carried on the substrate can be formed into pellets together after adding a binder or the like thereto.

EXAMPLE

Next, the present invention is described in detail based on the following examples.

In each example, a coin type battery was produced and its electrode active material was evaluated. The evaluation method used herein was the same as the conventional evaluation method for a secondary battery. The following explains a method for fabricating a test electrode, a method for producing a coin type battery and a method for evaluating battery characteristics one by one.

Example 1

(i) Method for Producing Test Electrode

The following operation was performed in an argon gas atmosphere in a dry box equipped with a gas purifier.

Thirty mg of the compound represented by the chemical formula (7):

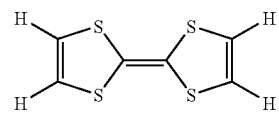

namely, tetrathiafulvalene, a compound in which $R^3$ to $R^6$ were replaced with hydrogen atoms in the formula (2), as an electrode active material, and 30 mg of acetylene black as a conductive material were thoroughly mixed, and then 1 mL of N-methyl-2-pyrrolidone was added thereto as a solvent to give a mixture.

In order to bind the active material and the conductive material, 5 mg of polyvinylidene fluoride was added to the obtained mixture as a binder, which was then thoroughly mixed to give a black slurry.

The slurry was applied onto an aluminum foil current collector, which was then vacuum-dried at room temperature for 1 hour. After drying, the product was punched into a 13.5 mm disc to give a test electrode.

(ii) Method for Producing Coin Type Battery

A coin type battery was produced through the following procedure using the test electrode fabricated in the above manner as the positive electrode and a lithium metal with a thickness of 300 μm as the negative electrode. FIG. 1 shows a vertical sectional view of the obtained coin type battery.

First, a test electrode 12 was situated inside a case 11. On the test electrode (positive electrode) 12, a separator 13 comprising a porous polyethylene sheet was placed. Subsequently, an electrolyte was fed into the case 11. The electrolyte was prepared by dissolving lithium hexafluorophosphate ($LiPF_6$) in a solvent mixture of ethylene carbonate and diethyl carbonate at a weight ratio of 1:1 at a concentration of 1 mol/L. A sealing plate 16 with a metal lithium 14 (negative electrode) attached underneath and a sealing ring 15 attached at the periphery was prepared. The sealing plate 16 was placed on the case 11 such that the metal lithium 14 and the test electrode 12 face each other. The case 11 was then sealed with the opening edge thereof crimping onto the sealing ring 15, using a pressing machine, to give a coin type battery for use in evaluation.

(iii) Characteristic Evaluation of Battery

The obtained coin type battery was charged and discharged at a constant current with a current value of 0.133 mA and a voltage range of 2.5 to 4.5 V, and its discharge capacity was measured at the first, 50th, 100th and 300th cycles. The average discharge voltage relative to oxidation-reduction potential of lithium (Li/Li$^+$) was also determined. The average discharge voltage was determined by the discharge of the first cycle. Little change was observed in discharge voltage until the 300th cycle. The average value was also determined when the discharge curve was stair-like due to a two-phase discharge reaction. The results are shown in Table 1.

TABLE 1

| | Discharge capacity (mAh/g) | | | | Average discharge voltage |
|---|---|---|---|---|---|
| | 1st | 50th | 100th | 300th | (E/V vs. Li/Li+) |
| Example 1 | 260 | 260 | 260 | 255 | 3.53 |
| Example 2 | 200 | 200 | 200 | 198 | 3.30 |
| Example 3 | 135 | 135 | 135 | 135 | 3.64 |
| Example 4 | 180 | 178 | 178 | 175 | 3.59 |
| Example 5 | 202 | 200 | 200 | 195 | 3.54 |
| Example 6 | 143 | 143 | 143 | 140 | 3.63 |
| Example 7 | 176 | 172 | 171 | 170 | 3.78 |
| Example 8 | 139 | 138 | 138 | 136 | 3.69 |
| Example 9 | 150 | 150 | 150 | 148 | 3.59 |
| Example 10 | 143 | 143 | 143 | 140 | 3.57 |
| Example 11 | 123 | 120 | 120 | 117 | 3.65 |
| Comp. Ex. 1 | 200 | 50 | 10 | 10 | 2.95 |

Its charge/discharge rate property was also evaluated. Here, the produced coin type battery was charged and discharged at a constant current with a current value of 0.665, 1.33 and 2.66 mA and a voltage range of 2.5 to 4.5 V, and the discharge capacity at the 50th cycle in each current value was measured. The results are shown in FIG. 2.

TABLE 2

| | Discharge capacity at the 50th cycle (mAh/g) | | |
|---|---|---|---|
| | 0.665 Ma | 1.33 mA | 2.66 mA |
| Example 1 | 260 | 255 | 252 |
| Example 2 | 200 | 193 | 190 |
| Example 3 | 135 | 130 | 123 |
| Example 4 | 178 | 170 | 166 |
| Example 5 | 200 | 194 | 190 |
| Example 6 | 143 | 140 | 132 |
| Example 7 | 172 | 168 | 160 |
| Example 8 | 138 | 130 | 121 |
| Example 9 | 150 | 144 | 140 |
| Example 10 | 143 | 138 | 134 |
| Example 11 | 120 | 114 | 111 |
| Comp. Ex. 1 | 45 | 5 | 5 |

Comparative Example 1

A coin type battery was produced and evaluated in the same manner as in EXAMPLE 1, except that an organic sulfur-based compound, namely, 2,5-dimercapto-1,3,4-thiadiazole (hereinafter referred to as "DMcT") manufactured by Aldrich Co. was employed as the active material for a test electrode. Tables 1 and 2 show the results.

Example 2

A coin type battery was produced and evaluated in the same manner as in EXAMPLE 1, except that the compound represented by the chemical formula (8):

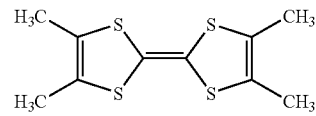

namely, tetramethyl-tetrathiafulvalene, a compound represented by the formula (2) in which $R^3$ to $R^6$ were replaced with methyl groups, was employed in stead of the compound represented by the chemical formula (7). Tables 1 and 2 show the results.

Example 3

A coin type battery was produced and evaluated in the same manner as in EXAMPLE 1, except that the compound represented by the chemical formula (9):

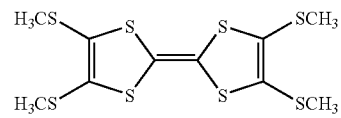

namely, a compound represented by the formula (2) in which $R^3$ to $R^6$ were replaced with thiomethyl groups, was employed in stead of the compound represented by the chemical formula (7). Tables 1 and 2 show the results.

Example 4

A coin type battery was produced and evaluated in the same manner as in EXAMPLE 1, except that the compound represented by the chemical formula (10):

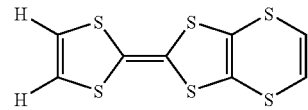

namely, a compound represented by the formula (3) in which $R^7$ and $R^8$ were replaced with hydrogen atoms and X was replaced with a sulfur atom, was employed in stead of the compound represented by the chemical formula (7). Tables 1 and 2 show the results.

Example 5

A coin type battery was produced and evaluated in the same manner as in EXAMPLE 1, except that the compound represented by the chemical formula (11):

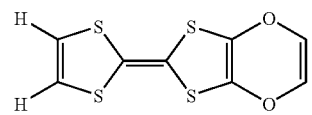

namely, a compound represented by the formula (3) in which $R^7$ and $R^8$ were replaced with hydrogen atoms and X was replaced with an oxygen atom, was employed in stead of the compound represented by the chemical formula (7). Tables 1 and 2 show the results.

Example 6

A coin type battery was produced and evaluated in the same manner as in EXAMPLE 1, except that the compound represented by the chemical formula (12):

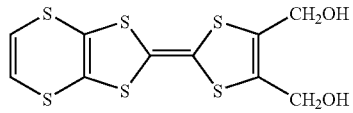

namely, a compound represented by the formula (3) in which $R^7$ and $R^8$ were replaced with hydroxymethyl groups and X was replaced with a sulfur atom, was employed in stead of the compound represented by the chemical formula (7). Tables 1 and 2 show the results.

Example 7

A coin type battery was produced and evaluated in the same manner as in EXAMPLE 1, except that the compound represented by the chemical formula (13):

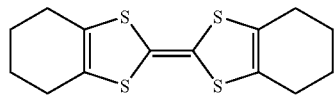

namely, a compound represented by the formula (4) in which X and Y were replaced with carbon atoms, was employed in stead of the compound represented by the chemical formula (7). Tables 1 and 2 show the results.

Example 8

A coin type battery was produced and evaluated in the same manner as in EXAMPLE 1, except that the compound represented by the chemical formula (14):

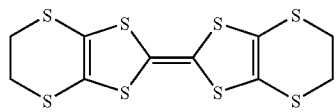

namely, a compound represented by the formula (4) in which X and Y were replaced with sulfur atoms, was employed in stead of the compound represented by the chemical formula (7). Tables 1 and 2 show the results.

Example 9

A coin type battery was produced and evaluated in the same manner as in EXAMPLE 1, except that the compound represented by the chemical formula (15):

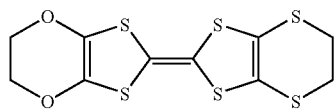

namely, a compound represented by the formula (4) in which X was replaced with an oxygen atom and Y was replaced with a sulfur atom, was employed in stead of the compound represented by the chemical formula (7). Tables 1 and 2 show the results.

Example 10

A coin type battery was produced and evaluated in the same manner as in EXAMPLE 1, except that the compound represented by the chemical formula (16):

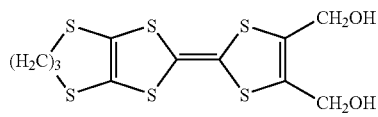

namely, a compound represented by the formula (5) in which $R^9$ and $R^{10}$ were replaced with hydroxymethyl groups and n was 3, was employed in stead of the compound represented by the chemical formula (7). Tables 1 and 2 show the results.

Example 11

A coin type battery was produced and evaluated in the same manner as in EXAMPLE 1, except that the compound represented by the chemical formula (6):

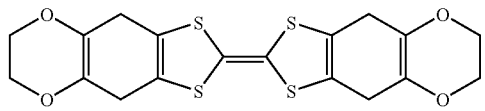

was employed in stead of the compound represented by the chemical formula (7). Tables 1 and 2 show the results.

[Study of Evaluation Results]

As is apparent from Table 1, the battery of COMPARATIVE EXAMPLE 1, in which an organic sulfur-based compound was used as the positive electrode active material, had a discharge capacity of 200 mAh/g at the first cycle, but the capacity decreased to 50 mAh/g at the 50th cycle and to 10 mAh/g at the 100th cycle.

All of the batteries of EXAMPLEs 1 to 11, in which compounds having a structure represented by the general formula (1) were used as the positive electrode active material, however, had a high average discharge voltage of around 3.5 V. Besides, there was little decrease observed in discharge capacity even at the 300th cycle.

The charge/discharge reaction mechanism of the organic sulfur-based compound used in COMPARATIVE EXAMPLE 1 is based on dissociation and recombination of S—S bond. Since this reaction has a low reaction frequency and the molecular structure significantly changes due to the charge/discharge reaction, the probability of recombination is small. Presumably, this is the reason why the battery of COMPARATIVE EXAMPLE 1 had little discharge capacity at the 100th cycle although it had a high discharge capacity at the first cycle. The foregoing illustrates that high cycle characteristics was unable to be obtained if a compound having the reaction mechanism based on dissociation and recombination of S—S bond was used as it was as the electrode active material.

As for the compounds of the present invention having a structure represented by the general formula (1) used in EXAMPLEs 1 to 11, there was little decrease in discharge capacity even after the 300th cycle. The reason for this is likely to be that, in the compounds, only anions and cations coordinated to the molecules during charge/discharge reaction, a significant change in the molecular structure did not occur and therefore the compounds themselves did not degrade as the number of cycles was increased.

The above results indicate that electrochemical devices incorporating a compound having a structure represented by the general formula (1) as an electrode active material had high cycle characteristics.

Further, as is apparent from Table 2, it was found that electrochemical devices incorporating a compound having a structure represented by the general formula (1) as an electrode active material had high charge/discharge rate property.

Example 12

An example of using a polymer compound having a plurality of the structures represented by the general formula (1) as the positive electrode active material is now given. This example employed a compound having tetrathiafulvalene structures with a polyacetylene chain as a main chain. The compound is represented by the chemical formula (17):

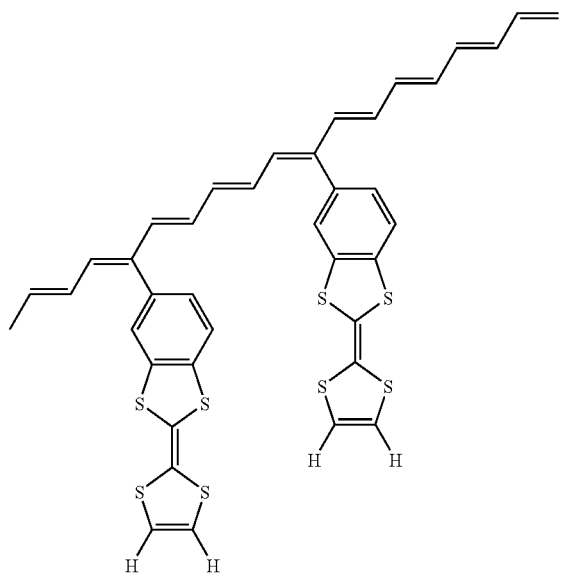

A coin type battery was produced in the same manner as in EXAMPLE 1, except that 40 mg of the compound represented by the chemical formula (17) was used instead of 30 mg of the compound represented by the chemical formula (7). Then, the obtained coin type battery was charged and discharged at a constant current with a current value of 0.133 mA and a voltage range of 2.5 to 4.5 V, and its discharge capacity was measured at the first, 50th, 100th and 300th cycles like EXAMPLE 1. Table 3 shows the results.

Table 3 indicates that the electrochemical device including a polymer compound having a plurality of the structures represented by the general formula (1) as an electrode active material also had high cycle characteristics.

TABLE 3

| | Discharge capacity (mAh/g) | | | | Average discharge voltage |
|---|---|---|---|---|---|
| | 1st | 50th | 100th | 300th | (E/V vs. Li/Li+) |
| Example 12 | 175 | 174 | 170 | 168 | 3.24 |

Example 13

An example of using a lithium-containing composite nitride as the negative electrode is shown below.

A coin type battery was produced in the same manner as in EXAMPLE 1, except that the below-described negative electrode was used. As the positive electrode, a test electrode analogous to that fabricated in EXAMPLE 1 was employed. Thus-produced coin type battery was charged and discharged at a constant current with a current value of 0.133 mA and a voltage range of 2.5 to 4.5 V, and its discharge capacity was measured at the first, 50th, 100th and 300th cycles like EXAMPLE 1. Table 4 shows the results.

The lithium-containing composite nitride used here was prepared by heating a lithium-cobalt alloy with a molar ratio of lithium to cobalt of 2.6/0.4 contained in a copper container in a nitrogen atmosphere at 800° C. for 2 hours to allow the alloy to react with nitrogen. After the reaction, the obtained black-gray colored nitride was pulverized into powders, which were then used as the negative electrode active material.

The powdered negative electrode active material was subjected to powder X-ray diffraction with CuKα radiation to find that the active material had a diffraction pattern of hexagonal crystal analogous to that of lithium nitride ($Li_3N$). From this, it was confirmed that a single-phase solid solution comprising lithium nitride was obtained in which Co was incorporated in the crystal structure of the lithium nitride. The composition of the synthesized lithium-containing composite nitride was $Li_{2.6}Co_{0.4}N$.

A negative electrode material mixture was obtained by thoroughly mixing powdered $Li_{2.6}Co_{0.4}N$, powdered carbon and powdered polytetrafluoroethylene as a binder at a weight ratio of 100:25:5. The obtained negative electrode active material mixture was applied onto a copper sheet, which was then rolled. The product was then punched into a disc with a diameter of 13.5 mm to give a negative electrode.

TABLE 4

| | Discharge capacity (mAh/g) | | | | Average discharge voltage |
|---|---|---|---|---|---|
| | 1st | 50th | 100th | 300th | (E/V vs. Li/Li+) |
| Example 13 | 260 | 260 | 255 | 254 | 2.45 |
| Example 14 | 260 | 260 | 258 | 255 | 2.03 |

Example 14

An example of using a lithium-containing titanium oxide as the negative electrode is given below.

A coin type battery was produced in the same manner as in EXAMPLE 1, except that the below-described negative electrode was used. As the positive electrode, a test electrode analogous to that fabricated in EXAMPLE 1 was employed. Thus-produced coin type battery was charged and discharged at a constant current with a current value of 0.133 mA and a voltage range of 2.5 to 4.5 V, and its discharge capacity was measured at the first, 50th, 100th and 300th cycles like EXAMPLE 1. Table 4 shows the results.

This example used powdered $LiTi_5O_{12}$ as the lithium-containing titanium oxide.

A negative electrode material mixture was obtained by thoroughly mixing powdered $LiTi_5O_{12}$, powdered carbon and polytetrafluoroethylene powder as the binder at a weight ratio of 100:25:5. The obtained negative electrode material mixture was applied onto a copper sheet, which was then rolled. The product was then punched into a disc with a diameter of 13.5 mm to give a negative electrode.

Table 4 illustrates that an electrochemical device, in which a compound having a structure represented by the general formula (1) was used as one electrode active material and a lithium-containing composite nitride or lithium-containing titanium oxide was used as the other electrode active material, has high cycle characteristics.

Example 15

An example of using compounds having a structure represented by the general formula (1) as both the positive and negative electrode active materials is given below.

This example used, as the positive electrode active material, the compound represented by the chemical formula (13):

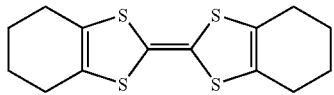

and, as the negative electrode active material, the compound represented by the chemical formula (8):

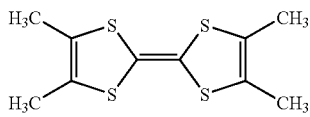

A coin type battery was produced in the same manner as in EXAMPLE 1, except that the above compounds were employed as the positive and negative electrode active materials, respectively. To be more specific, test electrodes were fabricated using the compound represented by the chemical formula (13) and the compound represented by the chemical formula (8), respectively, instead of the compound represented by the chemical formula (7). Using the test electrode with the compound of the chemical formula (13) as the positive electrode and the test electrode with the compound of the chemical formula (8) as the negative electrode, a coin type battery was produced. Then, the obtained coin type battery was charged and discharged at a constant current with a current value of 0.133 mA and a voltage range of 0.3 to 0.6 V, and its discharge capacity was measured at the first, 50th, 100th and 300th cycles like EXAMPLE 1. Table 5 shows the results.

Table 5 indicates that high cycle characteristics were also obtained when compounds represented by the general formula (1) were used in both electrodes.

TABLE 5

|  | Discharge capacity (mAh/g) | | | | Average discharge voltage |
| --- | --- | --- | --- | --- | --- |
|  | 1st | 50th | 100th | 300th | (E/V vs. Li/Li+) |
| Example 15 | 170 | 170 | 160 | 155 | 0.46 |
| Example 16 | 175 | 175 | 175 | 172 | 3.24 |

Example 16

An example of using, as the positive electrode active material, a polymer compound having a structure represented by the general formula (1) that forms a film is shown below. In this example, a film was prepared by electrolytic polymerization of the compound represented by the chemical formula (17):

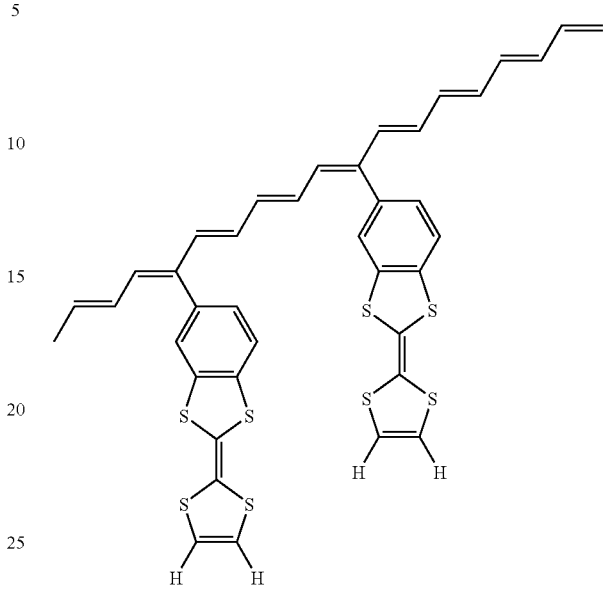

More precisely, an aluminum substrate was immersed in a solution prepared by dissolving the compound represented by the chemical formula (17) in acetonitrile at a concentration of 0.1 mol/L. Constant potential electrolysis at 2.0 V (relative to $Li/Li^+$) was performed between the substrate and the counter electrode. As a result, a 40 μm-thick film of the polymer compound was formed on the substrate.

This film was punched into a predetermined shape to give a positive electrode. A coin type battery was produced in the same manner as in EXAMPLE 1, except that the above-obtained positive electrode was used. Then, the obtained coin type battery was charged and discharged at a constant current with a current value of 0.133 mA and a voltage range of 3.0 to 3.8 V, and its discharge capacity was measured at the first, 50th, 100th and 300th cycles like EXAMPLE 1. Table 5 shows the results.

Table 5 indicates that high cycle characteristics were also obtained when a film comprising the polymer compound obtained by electrolytic polymerization was employed.

Example 17

This example provides a description of the case where an active material is carried on a substrate.

(i) Method for Producing Test Electrode

As the electrode active material, the compound represented by the chemical formula (18) with an alkyl trimethoxysilane group as a substituent:

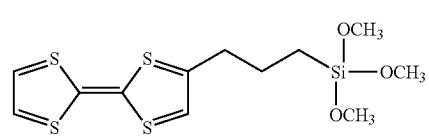

was used. As the substrate, active carbon was employed.

A treating liquid was prepared by mixing 5 parts by weight of the compound represented by the chemical formula (18) and 100 parts by weight of the solvent mixture of hexadecane and chloroform at a volume ratio of 4:1. In 100 mL of this treating liquid, 10 g of active carbon which had been ozone-treated at 120° C. for 10 minutes was immersed, which was then stirred for 12 hours. The ozone treatment was done to convert numerous functional groups being present on the surface of the active carbon into hydroxyl groups.

The active carbon was filtered from the treating liquid, which was then immersed in 100 mL of chloroform and stirred for 1 hour. Subsequently, the active carbon was filtered from the chloroform, which was again immersed in 100 mL of chloroform and stirred for 1 hour to be cleaned.

The cleaned active carbon was filtered, which was then vacuum-dried for 10 hours to give an active carbon carrying the electrode active material. It is to be noted that these steps were performed in an argon atmosphere at a humidity of −30° or less.

Whether the electrode active material was carried on the active carbon by chemical bonds was confirmed using a spectroscopy technique. Specifically, the active carbon carrying the electrode active material was subjected to IR measurement, and the peak attributed to S—H, the peak attributed to a C—S—C bond, the peak attributed to $CH_2$ and the peak attributed to an Si—O—Si bond were respectively observed at around 2500 $cm^{-1}$, at around 750 and 1250 $cm^{-1}$, at around 3000 $cm^{-1}$ and at around 1100 $cm^{-1}$. Any of these peaks were not observed in the case of active carbon only. The foregoing illustrates that the electrode active material was carried on the active carbon by chemical bonds.

(ii) Method for Producing Coin Type Battery

A coin type battery was produced in the same manner as in EXAMPLE 1, except that, instead of the compound represented by the chemical formula (7), 70 mg of the above-obtained composite material comprising the substrate and the electrode active material, 20 mg of acetylene black as a conductive material and 10 mg of polyvinylidene fluoride as a binder were used.

(iii) Characteristic Evaluation of Battery

The obtained coin type battery was repeatedly charged and discharged with a current value of 1.0 mA and a voltage range of 4.2 to 2.5 V. The charging and discharging was performed at an atmospheric temperature of 20%. Its discharge capacity (mAh/g) was measured at the first, 50th, 100th and 300th cycles. Table 6 shows the results as well as its theoretical capacity.

In Table 6, the theoretical capacity and measured discharge capacities are capacities per weight of the active material. Herein, the weight of the active material does not include the substrate weight. Table 6 illustrates that there was little capacity degradation concomitant with charge/discharge cycles because the electrode active material was carried on the active carbon (i.e. conductive substrate) by a —Si—O— bond. In this example, stable cycle characteristics were observed even after 300 cycles.

Example 18

A composite material comprising the substrate and an electrode active material was prepared in the same manner as in EXAMPLE 17, except that the compound represented by the chemical formula (19):

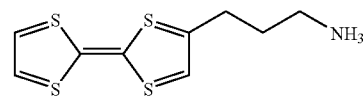

was used instead of the compound represented by the chemical formula (18). The compound represented by the chemical formula (19) has an amino group as a substituent. This amino group can form an amido bond with a carboxyl group present on the active carbon as the substrate.

Whether the electrode active material was carried on the active carbon by chemical bonds was confirmed using a spectroscopy technique. Specifically, in the case of the active carbon carrying the electrode active material, the peak attributed to N—H, the peak attributed to a C—N bond, the peak attributed to $CH_2$ and the peak attributed to an NH—CO bond were respectively observed at around 3000 $cm^{-1}$, at around 850 $cm^{-1}$, at around 3000 $cm^{-1}$ and at around 3400 $cm^{-1}$. Any of these peaks were not observed in the case of active carbon only. The above technique revealed that the electrode active material was carried on the active carbon by chemical bonds.

A coin type battery was produced and evaluated in the same manner as in EXAMPLE 17, except that thus-obtained composite material was used. Table 6 shows the results as well as its theoretical capacity. Table 6 illustrates that there was little capacity degradation concomitant with charge/discharge cycles because the electrode active material was carried on the active carbon (i.e. conductive substrate) by an amido bond. In this example, stable cycle characteristics were observed even after 300 cycles.

TABLE 6

|  | Theoretical capacity (mAh/g) | Discharge capacity (mAh/g) | | | | Average discharge voltage (E/V vs. Li/Li+) |
| --- | --- | --- | --- | --- | --- | --- |
|  |  | 1st | 50th | 100th | 300th |  |
| Example 17 | 146 | 140 | 138 | 135 | 132 | 3.6 |
| Example 18 | 204 | 200 | 200 | 195 | 190 | 3.5 |
| Example 19 | 278 | 275 | 276 | 272 | 270 | 3.7 |

Example 19

(i) Method for Producing Test Electrode

As the electrode active material, the compound represented by the chemical formula (20) with a thiol group as a substituent:

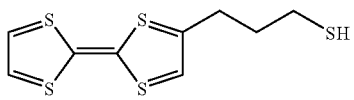

was used. As the substrate, gold particle was used.

Hundred parts by weight of the dispersion of gold particles (mean particle diameter: 10 μm) in N-methyl-2-pyrrolidon (NMP) at a concentration of 1 wt % and 3 parts by weight of the compound represented by the chemical formula (20) were mixed, which was then stirred at 25° C. for 12 hours. Subsequently, gold particles were filtered from the NMP, which was then vacuum-dried for 10 hours to give gold particles carrying the electrode active material. It is to be noted that these steps were performed in an argon atmosphere at a humidity of −30° or less.

Whether the electrode active material was carried on the gold particle by chemical bonds was confirmed by IR and XPS measurements.

Specifically, in IR measurement, the peak considered to be attributed to $CH_2$ and the peak considered to be attributed to a C—S—C bond were respectively observed at around 3000 $cm^{-1}$, and at around 750 and 1250 $cm^{-1}$. Any of these peaks were not observed in the case of gold particles only. In XPS measurement, the peak S (2p), which was not observed in the case of gold particles only, was observed. The foregoing illustrates that the electrode active material was carried on the gold particle by chemical bonds.

A coin type battery was produced and evaluated in the same manner as in EXAMPLE 17, except that the thus-obtained composite material comprising gold particles and the electrode active material. Table 6 shows the results and its theoretical capacity.

Table 6 illustrates that there was little capacity degradation concomitant with charge/discharge cycles because the electrode active material was carried on the gold particle (i.e. conductive substrate) by a gold-sulfur bond. In this example, stable cycle characteristics were observed even after 300 cycles.

EXAMPLEs 17 to 19 demonstrate that high cycle characteristics are obtained by allowing an electrode active material to be carried on a substrate by chemical bonds.

As described above, according to preferred embodiments of the present invention, it is possible to obtain a lightweight electrochemical device with high energy density and excellent cycle characteristics by using a compound having a structure represented by the general formula (1) as an electrode active material.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An electrochemical device comprising a positive electrode, a negative electrode and an electrolyte, wherein
   at least one of said positive and negative electrodes comprises a compound having a structure represented by the general formula (4):

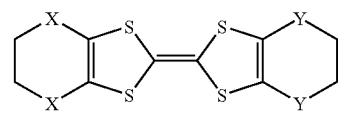

where X and Y are independent of each other and each represents a sulfur atom, an oxygen atom, a selenium atom, a tellurium atom or a methylene group,
   wherein said compound comprises a polymer compound having a plurality of the structures represented by the general formula (4), and
   said polymer compound has a polyacetylene chain as a main chain.

2. An electrochemical device comprising a positive electrode, a negative electrode and an electrolyte, wherein
   at least one of said positive and negative electrodes comprises a compound having a structure represented by the general formula (4):

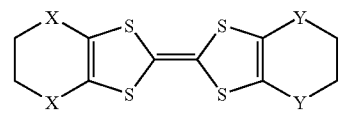

where X and Y are independent of each other and each represents a sulfur atom, an oxygen atom, a selenium atom, a tellurium atom or a methylene group,
   wherein said positive electrode includes said compound as a positive electrode active material; and said negative electrode includes, as a negative electrode active material, at least one selected from the group consisting of a lithium metal, a lithium-containing composite nitride and a lithium-containing composite titanium oxide.

3. An electrode active material for an electrochemical device comprising a compound having a structure represented by the general formula (1):

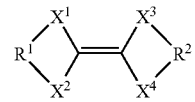

where $R^1$ and $R^2$ are independent of each other and each represents a linear or cyclic aliphatic group; $X^1$, $X^2$, $X^3$ and $X^4$ are independent of each other and each represents a sulfur atom, an oxygen atom, a selenium atom or a tellurium atom; and said aliphatic group can comprise at least one selected from the group consisting of an oxygen atom, a nitrogen atom, a sulfur atom, a silicon atom, a phosphorus atom and a boron atom,
   wherein said compound comprises a polymer compound having a plurality of the structures represented by the general formula (1) and said polymer compound has a polyacetylene chain as a main chain.

4. The electrode active material for an electrochemical device in accordance with claim 3, wherein
said compound is represented by the general formula (2):

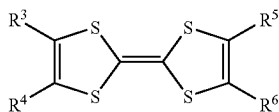

where $R^3$, $R^4$, $R^5$ and $R^6$ are independent of each other and each represents a linear or cyclic aliphatic group, a hydrogen atom, a hydroxyl group, a cyano group, an amino group, a nitro group or a nitroso group; and said aliphatic group can comprise at least one selected from the group consisting of an oxygen atom, a nitrogen atom, a sulfur atom, a silicon atom, a phosphorus atom, a boron atom and a halogen atom.

5. The electrode active material for an electrochemical device in accordance with claim 3, wherein
said compound is represented by the general formula (3):

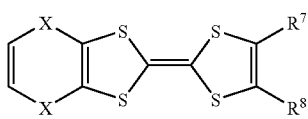

where $R^7$ and $R^8$ are independent of each other and each represents a linear or cyclic aliphatic group, a hydrogen atom, a hydroxyl group, a cyano group, an amino group, a nitro group or a nitroso group; X represents a sulfur atom, an oxygen atom, a selenium atom or a tellurium atom; and said aliphatic group can comprise at least one selected from the group consisting of an oxygen atom, a nitrogen atom, a sulfur atom, a silicon atom, a phosphorus atom, a boron atom and a halogen atom.

6. The electrode active material for an electrochemical device in accordance with claim 3, wherein
said compound is represented by the general formula (4):

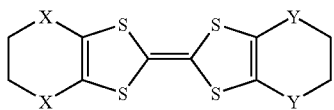

where X and Y are independent of each other and each represents a sulfur atom, an oxygen atom, a selenium atom, a tellurium atom or a methylene group.

7. The electrode active material for an electrochemical device in accordance with claim 3, wherein
said compound is represented by the general formula (5):

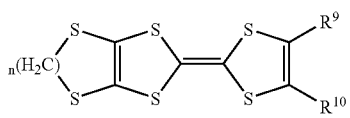

where $R^9$ and $R^{10}$ are independent of each other and each represents a linear or cyclic aliphatic group, a hydrogen atom, a hydroxyl group, a cyano group, an amino group, a nitro group or a nitroso group; said aliphatic group can comprise at least one selected from the group consisting of an oxygen atom, a nitrogen atom, a sulfur atom, a silicon atom, a phosphorus atom, a boron atom and a halogen atom; and n is not less than 1.

8. The electrode active material for an electrochemical device in accordance with claim 3, wherein
said compound is represented by the chemical formula (6):

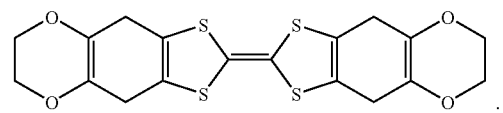

9. The electrode active material for an electrochemical device in accordance with claim 3, wherein said polymer compound forms a film.

10. The electrode active material for an electrochemical device in accordance with claim 3, further comprising a substrate carrying said compound, wherein said substrate and said compound are bonded by a chemical bond.

11. An electrochemical device comprising a positive electrode, a negative electrode and an electrolyte, wherein
at least one of said positive and negative electrodes comprises a compound having a structure represented by the general formula (1):

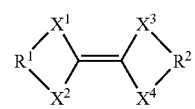

where $R^1$ and $R^2$ are independent of each other and each represents a linear or cyclic aliphatic group; $X^1$, $X^2$, $X^3$ and $X^4$ are independent of each other and each represents a sulfur atom, an oxygen atom, a selenium atom or a tellurium atom; and said aliphatic group can comprise at least one selected from the group consisting of an oxygen atom, a nitrogen atom, a sulfur atom, a silicon atom, a phosphorus atom and a boron atom,
wherein said compound comprises a polymer compound having a plurality of the structures represented by the general formula (1), and said polymer compound has a polyacetylene chain as a main chain.

12. An electrochemical device comprising a positive electrode, a negative electrode and an electrolyte, wherein
at least one of said positive and negative electrodes comprises a compound having a structure represented by any of
the general formula (2):

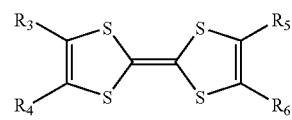

wherein $R^3$, $R^4$, $R^5$ and $R^6$ are independent of each other and each represents a linear or cyclic aliphatic group, a hydrogen atom, a hydroxyl group, a cyano group, an amino group, a nitro group or a nitroso group; and said aliphatic group can comprise at least one selected from the group consisting of an oxygen atom, a nitrogen atom, a sulfur atom, a silicon atom, a phosphorus atom, a boron atom and a halogen atom, the general formula (3):

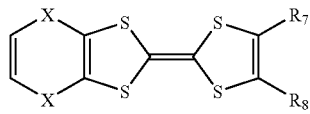

where $R^7$ and $R^8$ are independent of each other and each represents a linear or cyclic aliphatic group, a hydrogen atom, a hydroxyl group, a cyano group, an amino group, a nitro group up or a nitroso group; X represents a sulfur atom, an oxygen atom, a selenium atom or a tellurium atom; and said aliphatic group can comprise at least one selected from the group consisting of an oxygen atom, a nitrogen atom, a sulfur atom, a silicon atom, a phosphors atom, a boron atom and a halogen atom, the general formula (5):

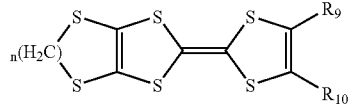

where $R^9$ and $R^{10}$ are independent of each other and each represents a linear or cyclic aliphatic group, a hydrogen atom, a hydroxyl group, a cyano group, an amino group, a nitro group or a nitroso group; said aliphatic group can comprise at least one selected from the group consisting of an oxygen atom, a nitrogen atom, a sulfur atom, a silicon atom, a phosphorus atom, a boron atom and a halogen atom; and n is not less than 1, or the chemical formula (6):

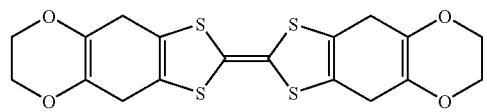

wherein said positive electrode includes said compound as a positive electrode active material; and said negative electrode includes, as a negative electrode active material, at least one selected from the group consisting of a lithium metal, a lithium-containing composite nitride and a lithium-containing composite titanium oxide.

* * * * *